(12) United States Patent
Jain et al.

(10) Patent No.: US 8,285,856 B1
(45) Date of Patent: Oct. 9, 2012

(54) METHODS AND SYSTEMS FOR INTEGRATING A MESSAGING SERVICE WITH AN APPLICATION

(75) Inventors: Akash Jain, Irving, TX (US); Amit Singh, Irving, TX (US); Miguel Quiroga, Granbury, TX (US); Syed Zafar Beyabani, Irving, TX (US); Fariborz Ebrahimi, Arlington, VA (US)

(73) Assignee: Verizon Data Services LLC, Temple Terrace, FL (US)

( * ) Notice: Subject to any disclaimer, the term of this patent is extended or adjusted under 35 U.S.C. 154(b) by 1008 days.

(21) Appl. No.: 11/252,544

(22) Filed: Oct. 19, 2005

Related U.S. Application Data

(63) Continuation-in-part of application No. 10/898,110, filed on Jul. 23, 2004, now Pat. No. 7,870,270.

(51) Int. Cl.
*G06F 15/16* (2006.01)
(52) U.S. Cl. .................................. 709/228; 709/227
(58) Field of Classification Search .............. 709/227, 709/228; 705/1; 715/200, 201
See application file for complete search history.

(56) References Cited

U.S. PATENT DOCUMENTS

| | | | |
|---|---|---|---|
| 5,428,694 A | 6/1995 | Betts et al. |
| 5,704,029 A | 12/1997 | Wright |
| 5,809,497 A | 9/1998 | Freund et al. |
| 5,911,143 A | 6/1999 | Deinhart et al. |
| 6,161,139 A | 12/2000 | Win et al. |
| 6,223,184 B1 | 4/2001 | Blackman et al. |
| 6,289,333 B1 | 9/2001 | Jawahar et al. |
| 6,308,173 B1 | 10/2001 | Glasser et al. |
| 6,314,415 B1 | 11/2001 | Mukherjee |
| 6,380,954 B1 | 4/2002 | Gunther |
| 6,430,571 B1 | 8/2002 | Doan et al. |
| 6,460,141 B1 | 10/2002 | Olden |
| 6,473,769 B1 | 10/2002 | Andrew et al. |
| 6,535,883 B1 | 3/2003 | Lee et al. |
| 6,662,231 B1 | 12/2003 | Drosset et al. |
| 6,816,906 B1 | 11/2004 | Icken et al. |
| 6,931,402 B1 | 8/2005 | Pereira |
| 6,976,078 B1 | 12/2005 | Icken et al. |
| 6,985,953 B1 | 1/2006 | Sandhu et al. |
| 7,010,760 B2 | 3/2006 | Amstein et al. |
| 7,089,319 B2 | 8/2006 | Lysenko et al. |
| 7,117,504 B2 | 10/2006 | Smith et al. |
| 7,185,044 B2 | 2/2007 | Ryan et al. |
| 7,240,360 B1 | 7/2007 | Phan |
| 7,246,320 B2 | 7/2007 | Foucher et al. |
| 7,404,140 B2 | 7/2008 | O'Rourke |
| 7,899,867 B1 | 3/2011 | Sherstinsky et al. |

(Continued)

OTHER PUBLICATIONS

"Index of /candan/papers", "Index of /candan/papers" [http:/aria.asu.edu/candan/papers], downloaded on Oct. 2, 2007.

(Continued)

*Primary Examiner* — George C Neurauter
*Assistant Examiner* — Cheikh Ndiaye

(57) ABSTRACT

Systems and methods for integrating a messaging service with an application may comprise integrating a front end of the application with the messaging service. Furthermore, systems and methods for integrating a messaging service with an application may comprise integrating a messaging service login and an application login, the messaging service login being associated with the messaging service and the application login being associated with the application. Moreover, systems and methods for integrating a messaging service with an application may comprise configuring the messaging service to initiate business logic based upon at least one of opening a session with the messaging service and closing a session with the messaging service.

18 Claims, 4 Drawing Sheets

U.S. PATENT DOCUMENTS

| | | | |
|---|---|---|---|
| 2001/0054064 A1 | 12/2001 | Kannan | |
| 2002/0032596 A1 | 3/2002 | Ohsaki et al. | |
| 2002/0040352 A1 | 4/2002 | McCormick | |
| 2002/0087383 A1* | 7/2002 | Cogger et al. | 705/10 |
| 2002/0147743 A1 | 10/2002 | Le et al. | |
| 2002/0180789 A1 | 12/2002 | Guttmann et al. | |
| 2003/0018725 A1 | 1/2003 | Turner et al. | |
| 2003/0036940 A1 | 2/2003 | Leymann et al. | |
| 2003/0084401 A1 | 5/2003 | Abel et al. | |
| 2003/0110443 A1 | 6/2003 | Yankovich et al. | |
| 2003/0233296 A1 | 12/2003 | Wagner | |
| 2004/0010502 A1 | 1/2004 | Bomfim et al. | |
| 2004/0064783 A1 | 4/2004 | Braun et al. | |
| 2004/0078105 A1 | 4/2004 | Moon et al. | |
| 2004/0078446 A1 | 4/2004 | Daniell et al. | |
| 2004/0083426 A1 | 4/2004 | Sahu | |
| 2004/0181513 A1 | 9/2004 | Henderson et al. | |
| 2004/0205529 A1 | 10/2004 | Poulose et al. | |
| 2004/0236655 A1 | 11/2004 | Scumniotales et al. | |
| 2004/0255252 A1 | 12/2004 | Rodriguez et al. | |
| 2005/0005259 A1 | 1/2005 | Avery et al. | |
| 2005/0010547 A1 | 1/2005 | Carinci et al. | |
| 2005/0060167 A1 | 3/2005 | Patron et al. | |
| 2005/0187781 A1 | 8/2005 | Christensen | |
| 2005/0235034 A1 | 10/2005 | Chen et al. | |
| 2005/0257045 A1 | 11/2005 | Bushman et al. | |
| 2006/0080130 A1* | 4/2006 | Choksi | 705/1 |
| 2006/0101098 A1 | 5/2006 | Morgan et al. | |
| 2006/0101119 A1* | 5/2006 | Qureshi et al. | 709/206 |
| 2007/0016641 A1 | 1/2007 | Broomhall | |
| 2007/0214001 A1 | 9/2007 | Patron et al. | |
| 2008/0086564 A1 | 4/2008 | Putman et al. | |
| 2008/0126988 A1 | 5/2008 | Mudaliar | |
| 2008/0127032 A1 | 5/2008 | Mital et al. | |

OTHER PUBLICATIONS

Candan, "Integration of Database and Internet Technologies for Scalable End-to-end E-commerce Systems", K. Candan and W. Li, *"Integration of Database and Internet Technologies for Scalable End-to-end E-commerce Systems"* [http:/aria.asu.edu/candan/papers/06chap.pdfl, *Idea Group Publishing*, 2003, pp. 84-112.

Stokes, David "Implementing online chat in a Web Portal", www.ibm.com/developerworks/ibm/libraryi-portalchat/ May 1, 2003, 17.

IPSwitch Instant Messaging; Instant Messaging as a Business Tool; Retrieved from the www.waybackmachine.org of site www.ipswitch.net, Available online Dec. 7, 2004, pp. 1-6.

* cited by examiner

METHODS AND SYSTEMS FOR INTEGRATING A MESSAGING SERVICE WITH AN APPLICATION

CROSS REFERENCE TO RELATED APPLICATIONS

This application is a continuation-in-part of U.S. application Ser. No. 10/898,110 filed Jul. 23, 2004 now U.S. Pat. No. 7,870,270 and entitled METHODS AND SYSTEMS FOR PROVIDING CAPABILITY MANAGEMENT AND USER ADMINISTRATION; U.S. application Ser. No. 10/898,111 filed Jul. 23, 2004 and entitled METHODS AND SYSTEMS FOR PROVIDING DATA FORM MANAGEMENT; and U.S. application Ser. No. 10/897,744 filed Jul. 23, 2004 and entitled METHODS AND SYSTEM FOR PROVIDING A DATA ACCESS LAYER, each assigned to the assignee of the present application, the disclosures of which are expressly incorporated herein by reference.

U.S. patent application Ser. No. 11/252,606, filed on even date herewith in the name of Edy Setiawan et al. and entitled METHODS AND SYSTEMS FOR PROVIDING PROCESS FLOW MANAGEMENT, U.S. patent application Ser. No. 11/252,543, filed on even date herewith in the name of Akash Jain et al. and entitled METHODS AND SYSTEMS FOR PROVIDING A MESSAGING SERVICE, and U.S. patent application Ser. No. 11/252,566, filed on even date herewith in the name of Edy Setiawan et al. and entitled METHODS AND SYSTEMS FOR DEFINING A FORM NAVIGATIONAL STRUCTURE, each of which is assigned to the assignee of the present application, are expressly incorporated herein by reference.

TECHNICAL FIELD

The present invention generally relates to providing a messaging service. More particularly, the present invention relates to providing a messaging service integrated with an application.

BACKGROUND INFORMATION

Call centers today use a variety of web-based applications. These applications provide computer-telephony integration, workflow automation, and legacy system integrations, for example. Recently, real-time communication (instant messaging (IM), for example) applications have gained popularity. These IM applications allow customers or other call center representatives to query a specialized group of representatives and receive answers in real time. However, these are mostly standalone applications that are not integrated with other applications.

The following illustrate the need for a messaging and collaboration platform to be integrated with an existing call center web application, for example. First, web applications should drive and control the access, usage and features of the IM application based on the user's current profile and the task being performed. During or after a messaging session, the representative may need to send or receive data to or from other applications.

Second, the average handling time (AHT) of each transaction can be reduced if the representative does not need to manually enter the application information. In addition, the look and feel of the messaging and collaboration application needs to be similar to that of other applications to reduce the learning curve. And finally, a call center representative's efficiency may be increased if the number of windows open on the representative's desktop is kept to a minimum.

Thus, there is a need for improved systems and methods for providing a messaging service. For instance, there is a need for a messaging service integrated with an application.

SUMMARY OF THE INVENTION

Consistent with embodiments of the present invention, systems and methods are disclosed for integrating a messaging service with an application.

In one aspect, a method for integrating a messaging service with an application comprises integrating a front end of the application with the messaging service, integrating a messaging service login and an application login, the messaging service login being associated with the messaging service and the application login being associated with the application, and configuring the messaging service to initiate business logic based upon at least one of opening a session with the messaging service and closing a session with the messaging service.

In another aspect, a system for integrating a messaging service with an application comprises a memory storage for maintaining a database and a processing unit coupled to the memory storage, wherein the processing unit is operative to integrate a front end of the application with the messaging service, integrate a messaging service login and an application login, the messaging service login being associated with the messaging service and the application login being associated with the application, and configure the messaging service to initiate business logic based upon at least one of opening a session with the messaging service and closing a session with the messaging service.

In yet another aspect, a computer-readable medium comprising a set of instructions which when executed perform a method for integrating a messaging service with an application, the method comprises integrating a front end of the application with the messaging service, integrating a messaging service login and an application login, the messaging service login being associated with the messaging service and the application login being associated with the application, and configuring the messaging service to initiate business logic based upon at least one of opening a session with the messaging service and closing a session with the messaging service.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
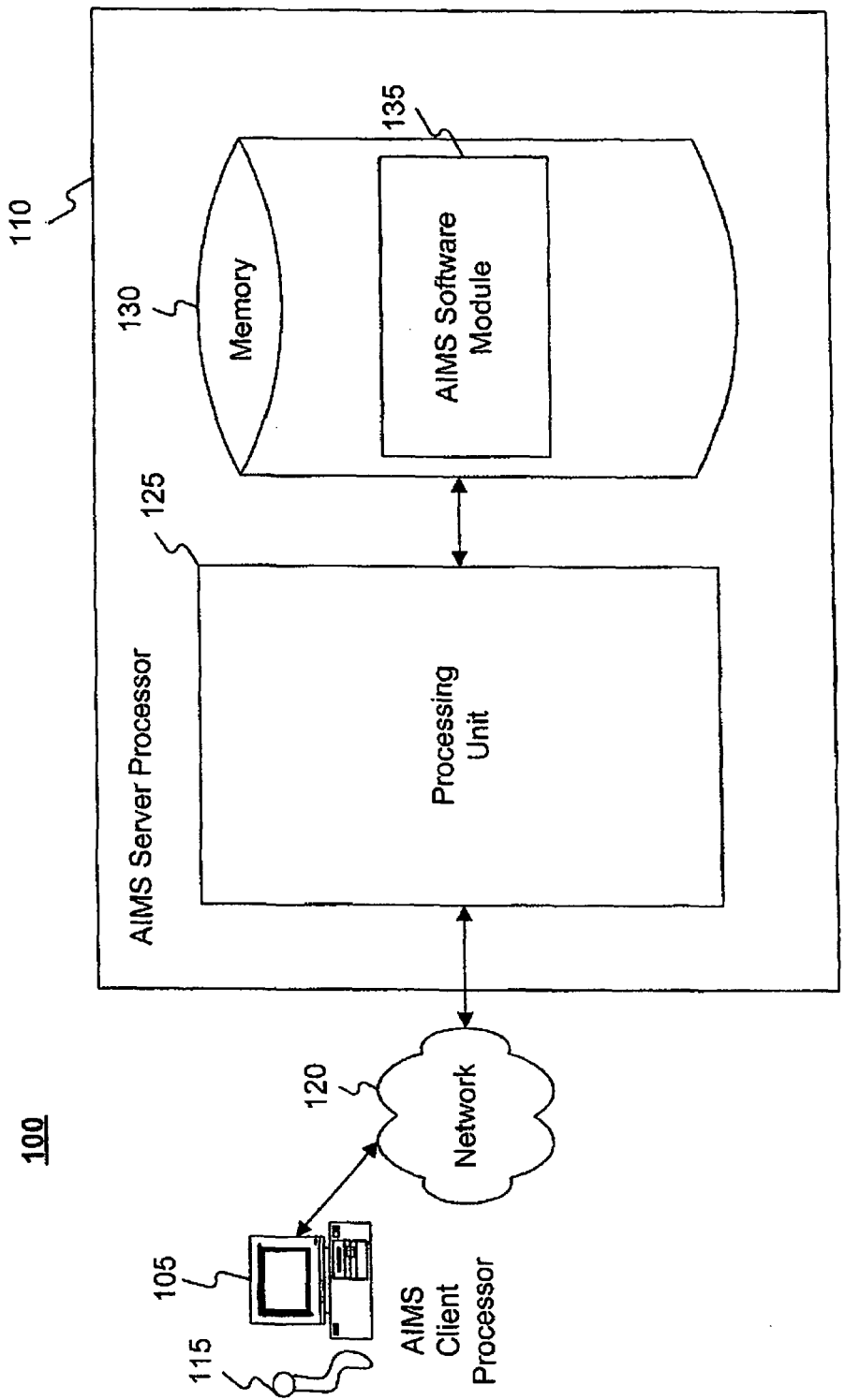
FIG. 1 is a functional block diagram of an exemplary system for integrating a messaging service with an application consistent with an embodiment of the present invention.

The following detailed description refers to the accompanying drawing. Wherever possible, the same reference numbers are used in the drawing and the following description to refer to the same or similar parts. While a presently preferred embodiment and features of the invention are described herein, modifications, adaptations and other implementations are possible, without departing from the spirit and scope of the invention. For example, substitutions, additions or modifications may be made to the components illustrated in the drawing, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may comprise application integrated messaging services (AIMS). AIMS may be integrated to any browser based web application and may have features discussed below. First, a messaging session can be launched from the application with which AIMS is integrated. For example, the messaging session may be launched from a form inside an operations automation application when one customer service representative (CSR) needs to ask another CSR a question. In addition, depending on the business logic, an enterprise workflow task can be initiated by a CSR from a messaging session. For example, a new ticket corresponding to a task can be generated upon closing a messaging session.

Furthermore, AIMS messaging and collaboration capabilities may be made role driven if required by the host application running a host system. For example, the host system may decide in real-time which capabilities and features a user (a CSR, for example) should be provided based on the user's role. Thus, the user sees AIMS where it is needed, when it is needed, and the way it is needed, because it may be embedded and driven through the host enterprise application of choice.

Moreover, AIMS may provide broadcast and coaching capabilities through an instant messaging (IM) channel for real-time information flow between supervisors, coaches, and other users. Also, AIMS may employ a composite-application model. For example, a single HTML page may have components from different applications that are hosted on different servers. Therefore, a user can access functionalities of several different applications on a single page. In addition, AIMS may have some advanced features like reporting and auditing, administrative controls, security, and a knowledge base to make it an enterprise-class application.

An embodiment consistent with the invention may comprise a system for integrating a messaging service with an application. The system may comprise a memory storage for maintaining a database and a processing unit coupled to the memory storage. The processing unit may be operative to integrate a front end of the application with the messaging service. Furthermore, the processing unit may be operative to integrate a messaging service login and an application login, the messaging service login being associated with the messaging service and the application login being associated with the application. Moreover, the processing unit may be operative to configure the messaging service to initiate business logic based upon at least one of opening a session with the messaging service and closing a session with the messaging service.

Consistent with an embodiment of the present invention, the aforementioned memory, processing unit, and other components may be implemented in an AIMS system, such as the exemplary AIMS system 100 of FIG. 1. Any suitable combination of hardware, software and/or firmware may be used to implement the memory, processing unit, or other components. By way of example, the memory, processing unit, or other components may be implemented with an AIMS client processor 105 or an AIMS server processor 110 in combination with system 100. The aforementioned system and device are exemplary and other systems and devices may comprise the aforementioned memory, processing unit, or other components, consistent with embodiments of the present invention.

Figure 2:
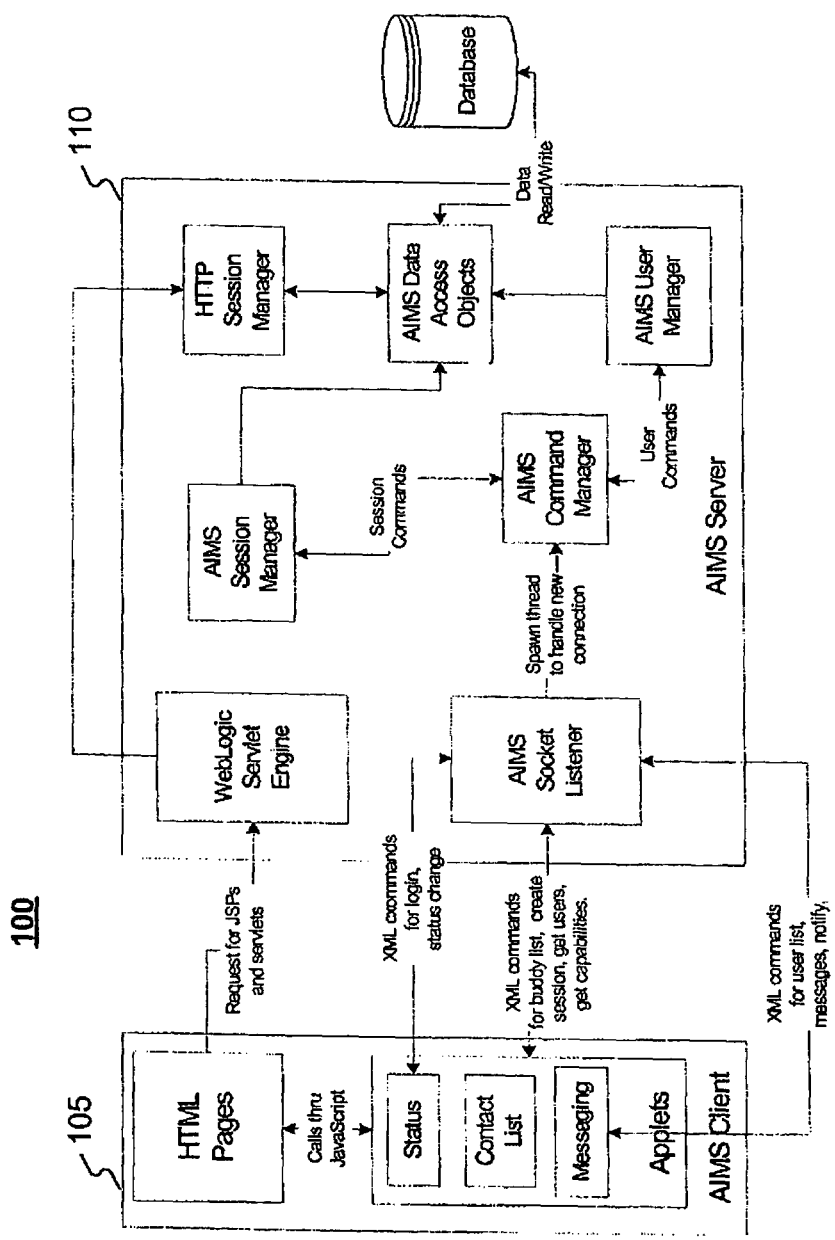
FIG. 2 is a functional block diagram that illustrates a exemplary messaging service consistent with an embodiment of the present invention.

By way of a non-limiting example, FIG. 1 illustrates system 100 in which the features and principles of the present invention may be implemented. As illustrated in the block diagram of FIG. 1, system 100 may include AIMS client processor 105 operated by a user 115, AIMS server processor 110, and a network 120. AIMS server processor 110 may include a processing unit 125 and a memory 130. Memory 130 may include an AIMS application software module 135 that, when executed on processing unit 125, causes messaging processor 110 to carry out various embodiments consistent with the invention. AIMS software module 135 may include a plurality of software components as shown in FIG. 2.

AIMS client processor 105 or AIMS server processor 110 ("the processors") included in system 100 may be implemented using a personal computer, network computer, mainframe, or other similar microcomputer-based workstation. The processors may, though, comprise any type of computer operating environments, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may include any data network, such as, for example, an existing secure credit network, a local area network (LAN), a wide area network (WAN), a public telephone switching network, an automated clearing house (ACH) network, or a wide area network, such as the Internet. LAN or WAN networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to ensure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via diskette, CD ROM, facsimile, conventional mail, an interactive voice response system (IVR), or via voice over a publicly switched telephone network.

FIG. 2 is a functional block diagram that illustrates system 100 in more detail. As shown in FIG. 2, system 100 may be a client-server based Java application built using, for example, extensible markings language (XML), JavaScript, dynamic hyper text markup language (DHTML), applets, and Java 2 Enterprise Edition (J2EE.) Processor 110 may be hosted on any J2EE 1.3 compliant application server and communication between applets and server may be accomplished with transmission control protocol (TCP) sockets.

As shown in FIG. 2, processor 105 may consist of hyper text markup language (HTML) pages with applets embedded in them. On processor 105, method calls may be made both from applets to JavaScript methods and vice-versa. For example, when a new message session needs to be opened in a browser, the applet calls, for example, a JavaScript method that dynamically defines an IFRAME that has already been declared and initialized. A Java Server Page (JSP), for example, that contains the messaging applet may be opened inside this IFRAME.

System 100 may use applet technology on processor 105. Three main applets, for example, may control all of the AIMS functionalities of processor 105. These applets may comprise a status applet, a contact list applet, and a messaging applet. Regarding the status applet, any application that needs to integrate with system 100 may contain an AIMS status bar. Accordingly, users may control their status by changing it between, for example, online, unavailable, or offline. A button may be provided in the application to launch the status applet. The status applet may be directly embedded in the main/home JSP or HTML of the web application with which instant messaging services needs to be integrated. Alternatively, a button may be provided for display on the web application that will launch a new browser window. That window may request an HTML/JSP page in which the applet may be embedded.

As shown in FIG. 2, a user's buddy list may be shown in the contact list applet. Messaging sessions may then be launched from this contact list applet. The contact list may open as a separate IFRAME in the browser window. The contact list applet may be given a look and feel similar to that of the parent web application. It may have a tools tab from which different features like inbox, knowledge base, and preferences may be launched.

When a messaging session is launched from the contact list applet, the session can open either as a separate window or in the same browser window, depending on the type of session that is being opened and the business logic behind it. Typically, a new window may be opened for messaging sessions that do not need any data to flow between the parent application and the messaging session. If the messaging window opens inside the parent application browser, some data may come from the parent application before the session is initialized. Also, upon closing the session, system 100 may send data back to the parent application.

A new messaging window may be opened inside a DIV tag (a separate section), which may contain an IFRAME, that is already declared and initialized to null in the parent HTML page. This sets aside a frame within a frame for the messaging to take place. The number of IFRAMEs initialized may be equal to the maximum number of concurrent messaging sessions that a user can participate in. When a user wants to open a new messaging session in the same browser window, an IFRAME's 'src' (source) attribute may be dynamically assigned to the URL of the JSP page that has the messaging applet embedded in it. When the messaging applet is closed, the DIV tag's inner HTML attribute may again be set to null. This way, multiple messaging sessions may be opened inside the browser by dynamically assigning a value to multiple IFRAMEs.

Users may communicate in real-time using the messaging applet. The messaging applet may be launched from the contact list applet as described earlier. A user may type a message here and click the "Send" button to send the message. The applet may have a menu tab from which the user can send files or can send a chat transcript as an email or fax.

Certain kinds of messaging sessions may require that data be passed back to the parent application at various points during its life cycle. One such example is upon the close of a messaging session when a ticket needs to be created. The ticket creation process may need information about the sender, receiver, type of ticket that needs to be created, or chat transcript, for example. The business logic may determine the type of information to be sent and the data may be posted by system 100 to the parent application's ticket creation URL as XML. After this data has been sent, the ticket creation page may open in the messaging session browser window. Now the IFRAME may display an HTML page from the parent application (and not from AIMS). The user may be asked to fill in the additional ticket fields and close it. When the ticket is closed, the 'inner HTML' attribute of the DIV may be set to null and the frame disappears from the browser window. This mechanism reduces the average handling time needed by the call center representative, for example, to complete the process. Because data may be entered automatically, it also drastically reduces the chances of errors.

Regarding processor 110, system 100 may use a socket-based server for implementing messaging between clients. All messages may go through processor 110 before they are delivered to processor 105. All the information about message sessions such as the message time, sender or receiver information, type of message session, and message transcript, for example, may be stored in a database so that it can be used later for reporting and auditing. The database may be stored in memory 130.

System 100 may employ a clustering mechanism when implementing processor 110. For example, when applications have a large user base, loads may be balanced across multiple servers. Since system 100 may comprise a real-time messaging system, synchronization across multiple servers may happen in-memory (random access memory with fast reads and writes) so that users see a minimum delay. Commercial application servers (like BEA WebLogic, for example) may not provide a mechanism to do in-memory replication.

To enable a cluster, a data communication layer may send object data from one server to all the other servers in the cluster. Upon receiving the data, the other servers synchronize the in-memory state. For example, assume that one cluster contains two servers and two users then login to the system. The first user logs into server 1 and the second user logs into server 2. The status that each user has logged into the system needs to be synchronized so that the two users can chat with each other.

Furthermore, JMS technology, for example, may be used to synchronize data in the cluster. JMS may implement both point-to-point and point-to-group communication models making it easier to add new servers to the cluster if the load on the system increases. The server that needs to send data to other servers in the cluster may publish a JMS message to a topic associated with that data. All of the other servers may be subscribed to that topic and will be able to receive the data.

Moreover system 100 may employ HTTP session replication. For example system 100 may create an HTTP session object for every new login after validating the user's credentials. On receiving an HTTP request from processor 105, for example, processor 110 may first validate the HTTP session object to check if the user is valid and the session has not expired. This session object may be replicated across the cluster so that every server can handle the request from processor 105. System 100, for example, may use BEA WebLogic server's HTTP replication mechanism.

In addition, system 100 may employ a locking mechanism. While data is being synchronized across multiple servers, the locking mechanism may provide atomic transactions, for example, those at the most granular level. System 100 may include a protocol for achieving data synchronization to avoid stale or inconsistent results.

Another major task in achieving in-memory replication is to identify all data objects that need to be synchronized and to validate that the client-server semantics still hold. System 100 may require that all client applets be signed so that a socket connection can be opened to a server different from the one to which it was originally downloaded.

System 100 may be completely integrated with the browser. No separate download may be required. For example, system 100 may use the Java plug-in to execute the applet on the client's (processor 105) browser. Conventional messaging applications require installation of the client on the desktop.

Also, in system 100, when a user receives a new message in an already open messaging session, or a new messaging session begins inside the browser when the browser is minimized, the notification mechanism may catch the eye of the user. Notification may achieved by flipping the title of the browser window every 300 ms, for example. Flipping of the title lets the user know that a new message has arrived or a new session has started. The flipping may stop as soon as the user maximizes the window or clicks at any point on the main area of the browser. The flipping mechanism may be implemented using JavaScript, for example. When a new message arrives, the applet may call a JavaScript method to start the flipping of the title. This method first checks the current state of the browser (on focus or on blur). If it is on blur, for example, then the flipping can start. The flipping happens by calling a function every 300 ms, for example, that first checks the current title and changes it to the other title using an if-else condition. When the user clicks on the browser window, the Windows on Focus( ) event may be invoked. The title flipping is then stopped.

System 100 may also provide an audible notification mechanism. When a new session opens or a new message arrives in an existing session, an audio is played to alert the user of the event. Different audio sounds may be played for different events. This mechanism may be implemented using Java Applet technology. Applet class may provide a method (getAudioClip( )) to get the AudioClip class which can then be played and stopped at any desired time.

Figure 3:
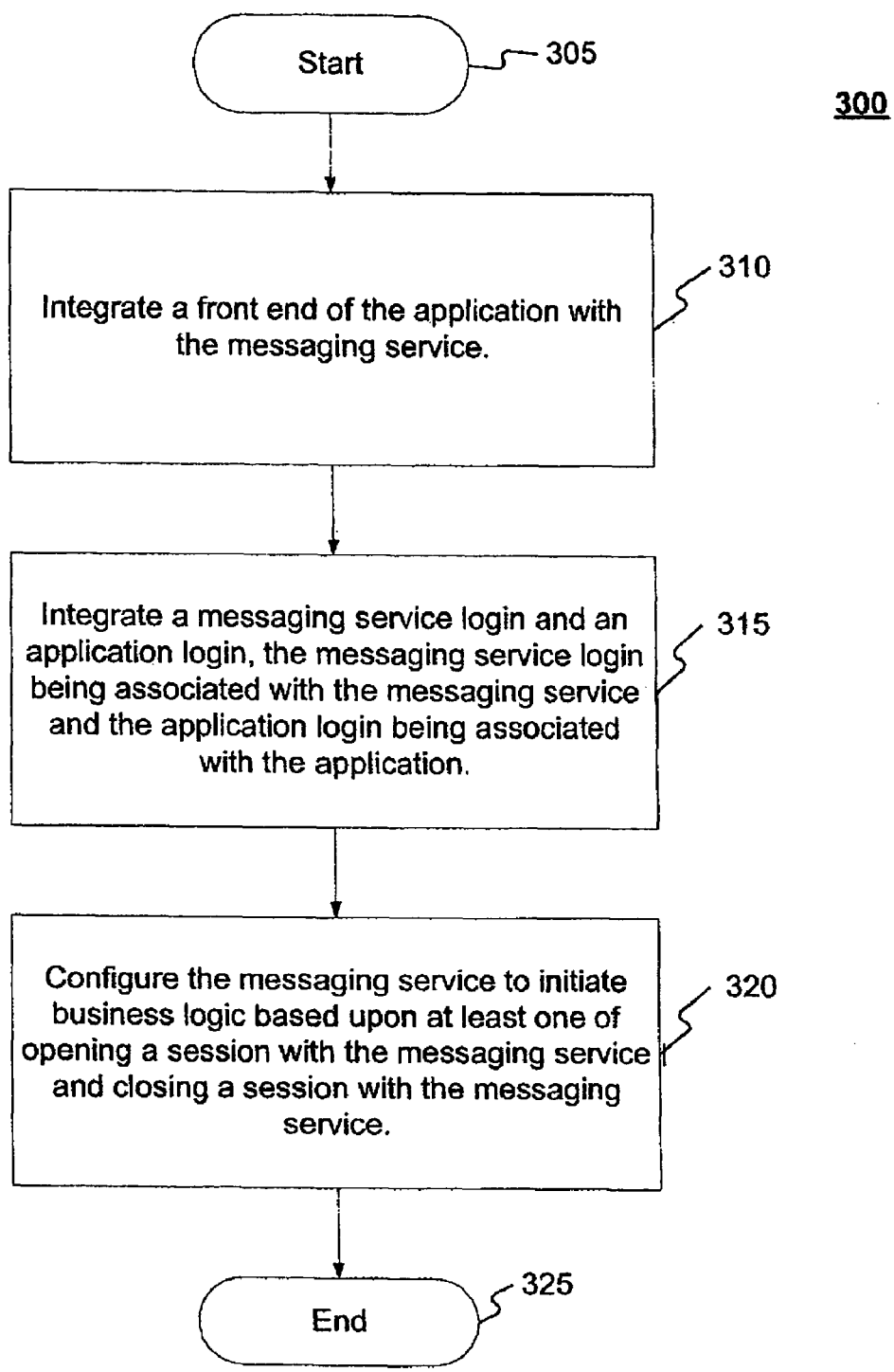
FIG. 3 is a flow chart of an exemplary method for integrating a messaging service with an application consistent with an embodiment of the present invention.

FIG. 3 is a flow chart setting forth the general stages involved in an exemplary method for integrating a messaging service with an application. Exemplary ways to implement the stages of method 300 will be described in greater detail below. Exemplary method 300 may begin at starting block 305 and proceed to stage 310 where processor 110 may integrate a front end of the application with the messaging service. This may be archived, for example, by processor 110 performing the following four steps. First, processor 110 may insert a status applet tag on the home/main JSP or HTML page of the application. The insertion can be achieved in one of the following two ways. The first way is to have multiple frames in the application and add the status applet to one frame then render all of the web content in another frame. Accordingly, the tag may be visible no matter where the user is in the application. Another way to insert the status applet is to launch a new browser window from the web application. This new browser window may contain the status applet and may need minimal changes to the web application.

Next, processor 110 may declare and initialize the DIV tag for the contact list applet. This tag may contain an IFRAME whose 'src' attribute may be dynamically set to the URL of the contact list JSP page. The contact list applet may be embedded inside this JSP.

Then, processor 110 may declare and initialize the DIV tag for the messaging applet. This tag may dynamically define IFRAMEs, for example, one per messaging session. The IFRAME's 'src' attribute may be set to the JSP of the messaging applet.

Next, processor 110 may set the document's domain attribute in such a way that the JSP/HTML pages, for example, can alter frames in pages from another web server. For example, the document domain property can be set to '.verizon.com' as the AIMS application and the web application may be hosted on an application whose name ends with '.verizon.com'.

From stage 310, where processor 110 integrates the front end of the application with the messaging service, exemplary method 300 may advance to stage 315 where processor 110 may integrate a messaging service login and an application login. The messaging service login may be associated with the messaging service and the application login may be associated with the application. For example, system 100 may use the automatic sign-on (ASO) login mechanism. The users of the web application with which the AIMS on processor 110 is integrated, do not need to login separately to AIMS. The login process may include the following stages. First, a user may be loaded into a database. For simplicity, the user credentials can be the same as that of the parent application. After the user logs into the parent application, an HTTP request may be sent to the AIMS application containing the user credentials for login. The AIMS application may validate the credentials, create an HTTP session, and send the status back with the HTTP session ID and other information as a response. All requests made to AIMS application from the parent application may contain the HTTP session ID for user validation. Upon finding a matching HTTP session ID, user information may be obtained from the session and the request may be served.

Once processor 110 integrates the messaging service login and the application login at stage 315, exemplary method 300 may continue to stage 320 where processor 110 may configure the messaging service to initiate business logic. This initiation may be based upon, for example, opening a session with the messaging service or closing a session with the messaging service. For example, some web applications may need the AIMS application to send them data after certain events (such as closing of a session or starting of a session, for example.) To achieve this, JavaScript methods may be implemented in the HTML pages of the AIMS application. For example, the JavaScript method can be implemented to "POST" data to a URL. Upon the occurrence of such an event, the applet may call the JavaScript method and the data may be sent to the application. In some cases, the parent application's page might need to appear in the space where the messaging applet was populated. In this scenario, upon sending the data, the IFRAME's 'src' is changed to that of the parent application's JSP or HTML page. After processor 110 configures the messaging service to initiate business logic at stage 320, exemplary method 300 ends at stage 325.

Figure 4:
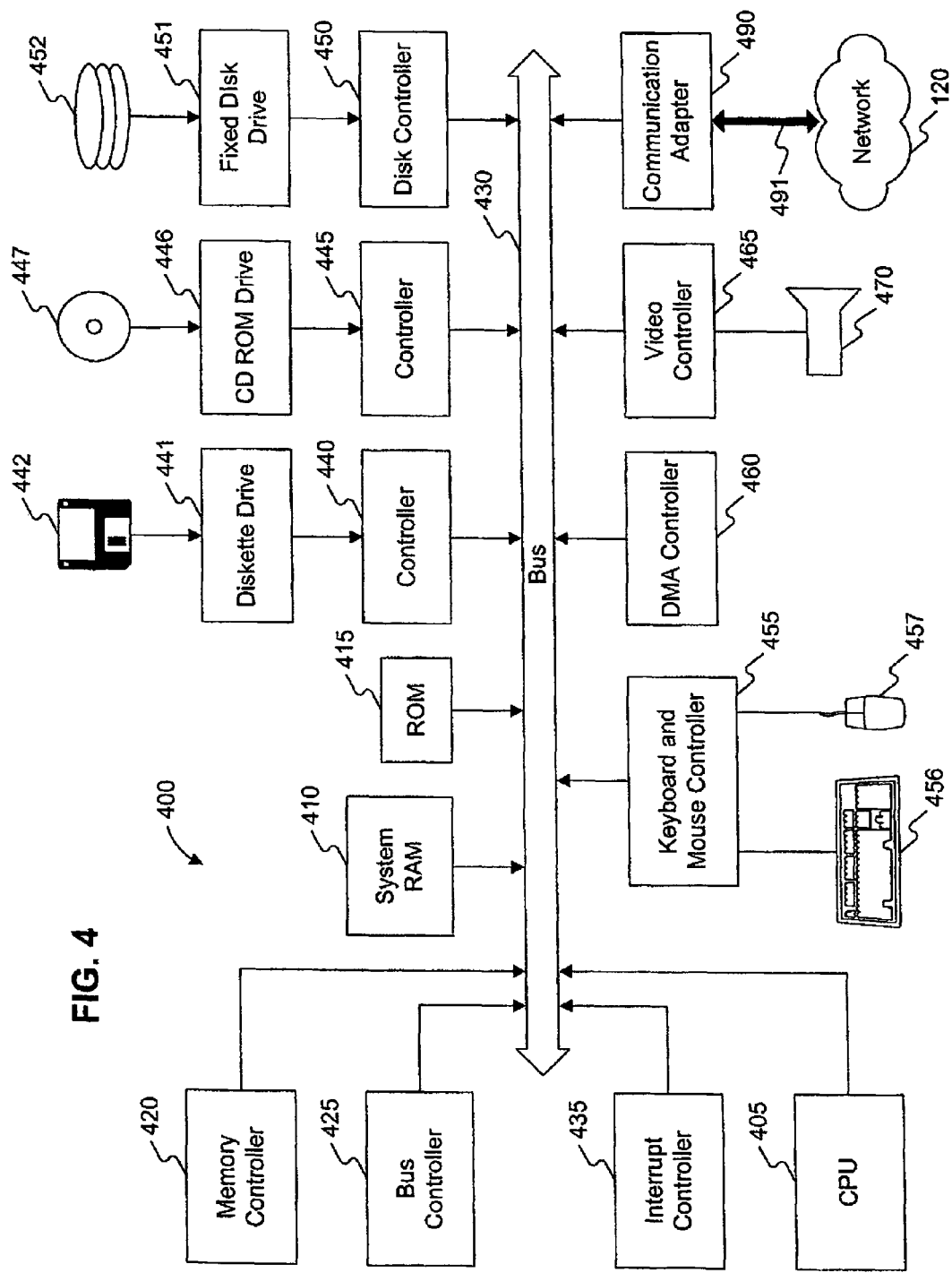
FIG. 4 is a functional block diagram of an exemplary computer system consistent with an embodiment of the present invention.

As herein embodied and illustrated, FIG. 4 is a diagram of a system architecture for a computer system 400 with which the invention may be implemented. Consistent with an exemplary embodiment of the present invention, the processors, as described above, may comprise, be disposed, or implemented within computer system 400. Although the description may refer to terms commonly used in describing particular computer systems, such as a personal computer, the description and concepts equally apply to other computer systems, such as network computers, workstations, and even mainframe computers having architectures dissimilar to FIG. 4.

Computer system 400 includes a central processing unit (CPU) 405, which may be implemented with a conventional microprocessor, a random access memory (RAM) 410 for temporary storage of information, and a read only memory (ROM) 415 for permanent storage of information. A memory controller 420 controls the RAM 410.

A bus 430 interconnects the components of computer system 400. A bus controller 425 controls the bus 430. An interrupt controller 435 receives and processes various interrupt signals from the system components.

Mass storage may be provided by diskette 442, CD ROM 447, or hard drive 452. Data and software may be exchanged with computer system 400 via removable media such as diskette 442 and CD ROM 447. Diskette 442 inserts into diskette drive 441 which, in turn, connects to bus 430 via a controller 440. Similarly, CD ROM 447 inserts into CD ROM drive 446 which, in turn, connects to bus 430 via controller 445. Hard disk 452 is part of a fixed disk drive 451 that connects to bus 430 by controller 450.

User input to computer system 400 may be provided by a number of devices. For example, a keyboard 456 and mouse 457 connect to bus 430 via controller 454. In addition, other input devices, such as a pen, a tablet, or speech recognition mechanisms, may connect to bus 430 and an appropriate controller and software. A direct memory access (DMA) controller 460 performs direct memory access to RAM 410. User output may be generated by a video controller 464 that controls video display 470.

Computer system 400 also includes a communications adaptor 490 that allows the system to be interconnected to additional computing resources via a local area network (LAN) or a wide area network (WAN), such as the Internet, schematically illustrated by bus 491 and network 120. Signals traveling through network 120 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 400 is generally controlled and coordinated by operating system software. The operating system controls allocation of system resources and performs tasks, such as memory management, process scheduling, networking, and services, among other things.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, hard disks, floppy disks, a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification be considered as exemplary only, with a true scope and spirit of the invention being indicated by the following claims and their full scope of equivalents.

What is claimed is:

1. A method for integrating a messaging service with a parent application associated with a business entity, the method comprising the steps, performed by a computer, of:
   integrating a front end of the parent application with the messaging service;
   integrating a messaging service login and a parent application login, the messaging service login being associated with the messaging service and the parent application login being associated with the parent application;
   assigning a source attribute of a messaging window to a page of a messaging applet associated with the messaging service, to provide a messaging session between users; and
   configuring the messaging service to initiate a customer service ticket creation process, the customer service ticket having a first set of fields and a second set of fields,
   wherein, in response to one of the users closing the messaging session, the messaging service:
      identifies selected business information generated during the messaging session;
      posts, at a storage location corresponding to a customer service ticket creation uniform resource locator (URL) associated with the parent application, the identified business information to the first set of fields of the customer service ticket;
      reassigns the source attribute of the messaging window from the page of the messaging applet to a page of a customer service ticket creation applet associated with the parent application, such that the page of the customer service ticket creation applet is displayed in the messaging window,
      the page of the customer service ticket creation applet prompting one of the users to enter further business information for the second set of fields of the customer service ticket; and
      posts, at the URL associated with the parent application, the entered business information to the second set of fields of the customer service ticket.

2. The method of claim 1, wherein integrating the front end of the parent application with the messaging service further comprises:
- inserting a status applet tag on a home page of the parent application, the status applet tag being associated with a status applet;
- declaring a DIV tag for a contact list applet;
- initializing the DIV tag for the contact list applet, the DIV tag for the contact list applet containing a first IFRAME with a source attribute being dynamically set to a URL of a contact list JSP page the contact list applet being embedded inside the contact list JSP page;
- declaring a DIV tag for the messaging applet;
- initializing the DIV tag for the messaging applet, the DIV tag for the messaging applet dynamically defining second IFRAMEs, one per messaging session, source attributes of the second IFRAMEs being set to a messaging applet JSP associated with the messaging applet; and
- setting a domain attribute of documents associated with the parent application wherein frames in pages coming from a server hosting the parent application can be altered by frames in pages coming from a server hosting the messaging service.

3. The method of claim 2, wherein inserting the status applet tag on the home page of the parent application further comprises:
- providing multiple frames in the parent application;
- adding the status applet to one frame of the multiple frames in the parent application; and
- rendering all web content of the multiple frames in another frame of the multiple frames in the parent application.

4. The method of claim 2, wherein inserting the status applet tag on the home page of the parent application further comprises launching a new browser window from the parent application, the new browser window containing the status applet.

5. The method of claim 1, wherein integrating the messaging service login and the parent application login further comprises:
- providing a database containing user credentials associated with a user, the user credentials being the same as parent application user credentials associated with the parent application;
- configuring the parent application to send a request to the messaging service, the request being sent when the user logs into the parent application, the request containing the user credentials wherein the messaging service is configured to validate the credentials and to send a status back to the parent application with a session identification; and
- configuring subsequent requests made to the messaging service from the parent application to contain the session identification wherein, upon validating the session identification found in the subsequent requests, the subsequent requests are served by the messaging service.

6. The method of claim 1, further comprising configuring the parent application and the messaging service to operate on a server cluster, servers in the server cluster being synchronized in-memory.

7. A system for integrating a messaging service with a parent application associated with a business entity, the system comprising:
- a memory storage device for maintaining a database; and
- a processing unit coupled to the memory storage, wherein the processing unit is operative to:
  - integrate a front end of the parent application with the messaging service;
  - integrate a messaging service login and a parent application login, the messaging service login being associated with the messaging service and the parent application login being associated with the parent application;
  - assign a source attribute of a messaging window to a page of a messaging applet associated with the messaging service, to provide a messaging session between users; and
  - configure the messaging service to initiate a customer service ticket creation process, the customer service ticket having a first set of fields and a second set of fields,
  - wherein, in response to one of the users closing the messaging session, the messaging service:
    - identifies selected business information generated during the messaging session;
    - posts, at a storage location corresponding to a customer service ticket creation uniform resource locator (URL) associated with the parent application, the identified business information to the first set of fields of the customer service ticket;
    - reassigns the source attribute of the messaging window from the page of the messaging applet to a page of a customer service ticket creation applet associated with the parent application, such that the page of the customer service ticket creation applet is displayed in the messaging window,
    - the page of the customer service ticket creation applet prompting entry of further business information for the second set of fields of the customer service ticket; and
    - posts, at the URL associated with the parent application, the entered business information to the second set of fields of the customer service ticket.

8. The system of claim 7, wherein the processing unit is further operative to:
- insert a status applet tag on a home page of the parent application, the status applet tag being associated with a status applet;
- declare a DIV tag for a contact list applet;
- initialize the DIV tag for the contact list applet, the DIV tag for the contact list applet containing a first IFRAME with a source attribute being dynamically set to a URL of a contact list JSP page, the contact list applet being embedded inside the contact list JSP page;
- declare a DIV tag for the messaging applet;
- initialize the DIV tag for the messaging applet, the DIV tag for the messaging applet dynamically defining second IFRAMEs, one per messaging session, source attributes of the second IFRAMEs being set to a messaging applet JSP associated with the messaging applet; and
- set a domain attribute of documents associated with the parent application wherein frames in pages coming from a server hosting the parent application can be altered by frames in pages coming from a server hosting the messaging service.

9. The system of claim 8, wherein the processing unit is further operative to:
- provide multiple frames in the parent application;
- add the status applet to one frame of the multiple frames in the parent application; and
- render all web content of the multiple frames in another frame of the multiple frames in the parent application.

10. The system of claim 8, wherein the processing unit is further operative to launch a new browser window from the parent application, the new browser window containing the status applet.

11. The system of claim 7, wherein the processing unit is further operative to:
provide a database containing user credentials associated with a user, the user credentials being the same as parent application user credentials associated with the parent application;
configure the parent application to send a request to the messaging service, the request being sent when the user logs into the parent application, the request containing the user credentials wherein the messaging service is configured to validate the credentials and to send a status back to the parent application with a session identification; and
configure subsequent requests made to the messaging service from the parent application to contain the session identification wherein, upon validating the session identification found in the subsequent requests, the subsequent requests are served by the messaging service.

12. The system of claim 7, wherein the processing unit is further operative to configure the parent application and the messaging service to operate on a server cluster, servers in the server cluster being synchronized in-memory.

13. A non-transitory computer-readable storage medium storing a set of instructions which, when executed by a computer, cause the computer to perform a method for integrating a messaging service with a parent application associated with a business entity, the method comprising:
integrating a front end of the parent application with the messaging service;
integrating a messaging service login and a parent application login, the messaging service login being associated with the messaging service and the parent application login being associated with the parent application;
assigning a source attribute of a messaging window to a page of a messaging applet associated with the messaging service, to provide a messaging session between users; and
configuring the messaging service to initiate a customer service ticket creation process, the customer service ticket having a first set of fields and a second set of fields, wherein, in response to one of the users closing the messaging session, the messaging service:
identifies selected business information generated during the messaging session;
posts, at a storage location corresponding to a customer service ticket creation uniform resource locator (URL) associated with the parent application, the identified business information to the first set of fields of the customer service ticket;
reassigns the source attribute of the messaging window from the page of the messaging applet to a page of a customer service ticket creation applet associated with the parent application, such that the page of the customer service ticket creation applet is displayed in the messaging window,
the page of the customer service ticket creation applet prompting one of the users to enter further business information for the second set of fields of the customer service ticket; and
posts, at the URL associated with the parent application, the entered business information to the second set of fields of the customer service ticket.

14. The computer-readable storage medium of claim 13, wherein integrating the front end of the parent application with the messaging service further comprises:
inserting a status applet tag on a home page of the parent application, the status applet tag being associated with a status applet;
declaring a DIV tag for a contact list applet;
initializing the DIV tag for the contact list applet, the DIV tag for the contact list applet containing a first IFRAME with a source attribute being dynamically set to a URL of a contact list JSP page the contact list applet being embedded inside the contact list JSP page;
declaring a DIV tag for the messaging applet;
initializing the DIV tag for the messaging applet, the DIV tag for the messaging applet dynamically defining second IFRAMEs, one per messaging session, source attributes of the second IFRAMEs being set to a messaging applet JSP associated with the messaging applet; and
setting a domain attribute of documents associated with the parent application wherein frames in pages coming from a server hosting the parent application can be altered by frames in pages coming from a server hosting the messaging service.

15. The computer-readable storage medium of claim 14, wherein inserting the status applet tag on the home page of the parent application further comprises:
providing multiple frames in the parent application;
adding the status applet to one frame of the multiple frames in the parent application; and
rendering all web content of the multiple frames in another frame of the multiple frames in the parent application.

16. The computer-readable storage medium of claim 14, wherein inserting the status applet tag on the home page of the parent application further comprises launching a new browser window from the parent application, the new browser window containing the status applet.

17. The computer-readable storage medium of claim 13, wherein integrating the messaging service login and the parent application login further comprises:
providing a database containing user credentials associated with a user, the user credentials being the same as parent application user credentials associated with the parent application;
configuring the parent application to send a request to the messaging service, the request being sent when the user logs into the parent application, the request containing the user credentials wherein the messaging service is configured to validate the credentials and to send a status back to the parent application with a session identification; and
configuring subsequent requests made to the messaging service from the parent application to contain the session identification wherein, upon validating the session identification found in the subsequent requests, the subsequent requests are served by the messaging service.

18. The computer-readable storage medium of claim 13, further comprising configuring the parent application and the messaging service to operate on a server cluster, servers in the server cluster being synchronized in-memory.

* * * * *